United States Patent [19]

Lafonta et al.

[11] Patent Number: 4,732,457
[45] Date of Patent: Mar. 22, 1988

[54] AUTONOMOUS POWER SUPPLY FOR OBSERVATION DEVICE, IN PARTICULAR WITH STEREOSCOPIC EFFECT

[75] Inventors: Fernande F. Lafonta; Paul A. Lafonta, both of Paris, France

[73] Assignee: L'Etat Francais represente par le Delegue Ministeriel pour l'Armement

[21] Appl. No.: 760,812

[22] Filed: Jul. 31, 1985

[30] Foreign Application Priority Data

Aug. 16, 1984 [FR] France ............................ 84 12832

[51] Int. Cl.⁴ ...................... G02F 1/03; G02B 27/22; H03K 3/86
[52] U.S. Cl. .................................. 350/356; 328/67; 350/132; 350/393
[58] Field of Search ............ 350/132, 356, 393; 307/244, 268; 328/67; 358/92

[56] References Cited

U.S. PATENT DOCUMENTS

| | | | |
|---|---|---|---|
| 3,292,091 | 12/1966 | Kosanke et al. | 328/67 |
| 3,879,687 | 4/1975 | Daehlin et al. | 350/393 |
| 3,912,945 | 10/1975 | Nakagawa | 307/252 C |
| 3,963,945 | 6/1976 | Colyn | 307/268 |

FOREIGN PATENT DOCUMENTS

| | | | |
|---|---|---|---|
| 959317 | 12/1974 | Canada | 350/132 |
| 3214021 | 10/1983 | Fed. Rep. of Germany | 350/356 |
| 111828 | 9/1981 | Japan | 350/133 |
| 316187 | 11/1971 | U.S.S.R. | 328/67 |

OTHER PUBLICATIONS

Soltoff, B. M., "Television Applications of PLZT Ceramics", International Broadcast Eng. 6, 7–1976, pp. 18–21.

*Primary Examiner*—William H. Punter
*Attorney, Agent, or Firm*—Parkhurst & Oliff

[57] ABSTRACT

The autonomous power supply for observation device with capacitive-effect electrooptical cells includes a low-voltage power source, clock or synchronization circuits, switches and circuits processing the clock signals or synchronization to control circuit creating intermittent high voltage.

10 Claims, 15 Drawing Figures

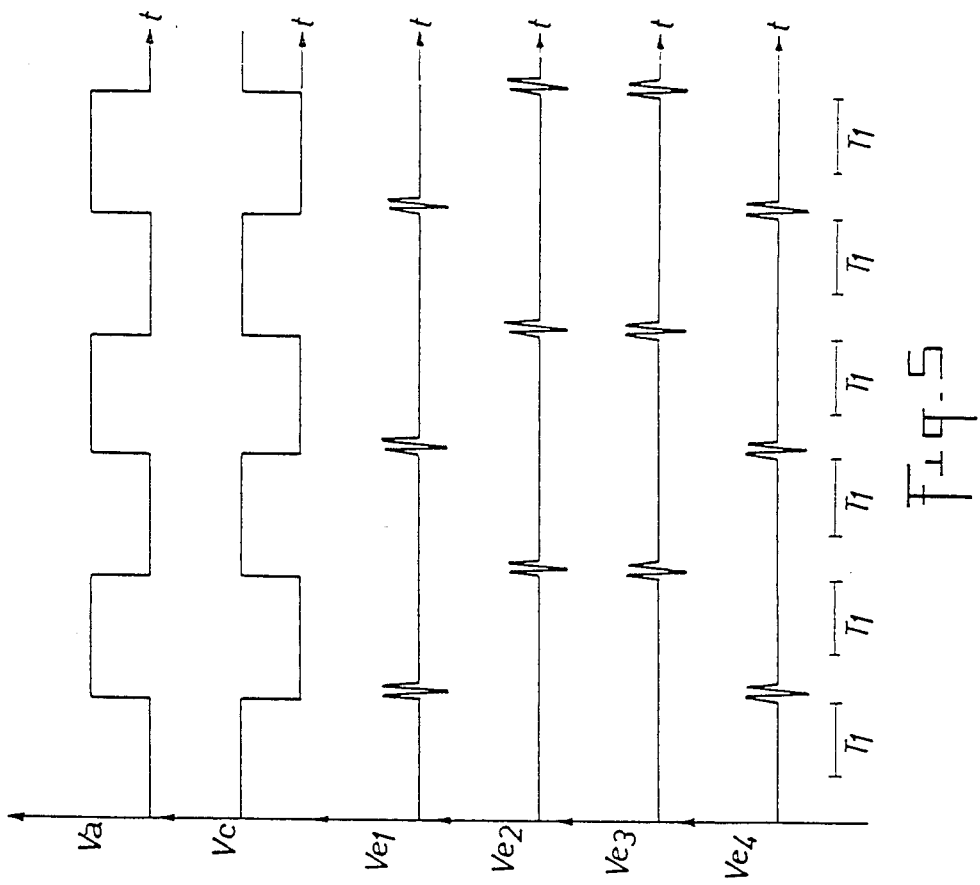
Fig. 5
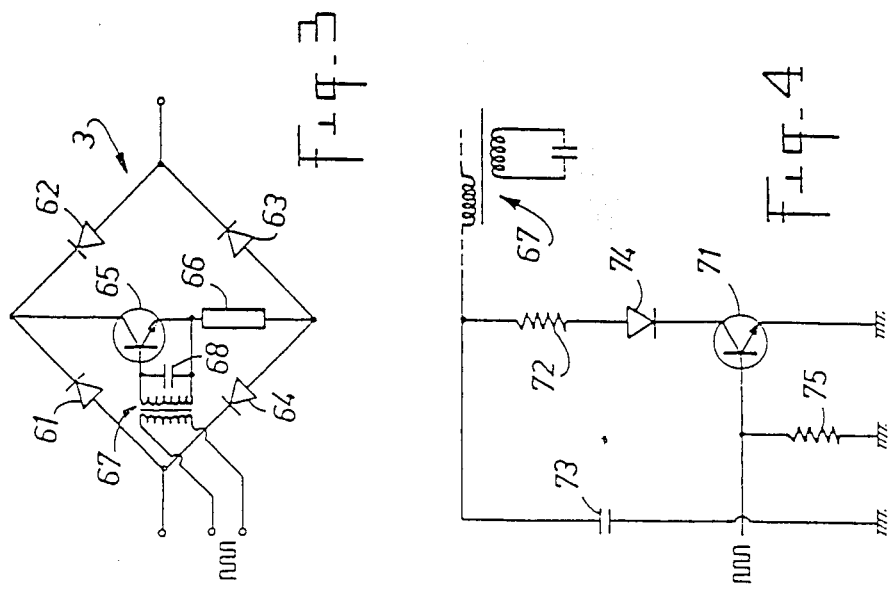
Fig. 3
Fig. 4

AUTONOMOUS POWER SUPPLY FOR OBSERVATION DEVICE, IN PARTICULAR WITH STEREOSCOPIC EFFECT

BACKGROUND AND SUMMARY OF THE INVENTION

The present invention relates to an autonomous power supply for an observation device using at least one electrooptical modulator cell having a capacitive effect and containing an electrooptical material, working with a system of control electrodes receiving high-amplitude electrical signals, and including clock systems to time the periodic application of electrical control signals to the electrooptical cell electrodes.

Stereoscopic image observation devices are known that use a pair of glasses including one right-hand and one left-hand device, through which a person can observe an image with the right eye and with the left eye, respectively. The right-hand and left-hand devices each include a capacitive-effect electrooptical cell consisting of an electrooptical material, e.g. of the PLZT type, and the associated control electrodes. Control signals are applied alternately to the control electrodes of the two electrooptical cells, to allow the light itself to be transmitted alternatively through the right-hand and left-hand devices, each of which includes one such cell, and thus create a stereoscopic effect. When observing television or movie images, the alternating control voltages applied to the right and left devices of the eyeglasses must also be synchronized with the image sequencing laws. This can be done, for example, by having the television receiver emit a carrier wave of the infrared or ultrasonic type, for example, modulated by a synchronization signal, or by having the image itself carry specific "right" and "left" information. The stereoscopic image observation apparatus must then be equipped with the means for receiving this modulated carrier wave, so that the synchronization information can be extracted, to apply the control signals alternately to the right and left parts of the spectacles.

The control voltages applied to the capacitive effect electrooptical cells are particularly high, and can be of the order of 1000 V. Consequently, the use of such high voltages may be dangerous to the person using the stereoscopic image observation device, particularly if the high voltage generator is mounted directly on the pair of glasses.

In classical stereoscopic image observation systems, the high voltage needed is first created in a high-voltage generator circuit that can produce a continuous high voltage, and this high voltage is then switched alternately to each pair of electrodes associated with one cell. This means that the converter or high voltage generator is operating continuously, and the current applied to the electrooptical cell electrodes cannot be limited easily and simply except by inserting a resistance, which wastes power and affects the speed of the transient signals. Furthermore, a capacitive storage element must be available that is much larger than the electrooptical cells, and this storage element constitutes a energy tank that may be dangerous. Moreover, switches that operate on high-level continuous direct current are relatively complicated.

The purpose of the present invention is precisely to remedy the above-identified disadvantages with an autonomous power supply that offers a high level of safety, compactness, low power consumption and good stability of the signals generated, while it is still possible to adjust the voltage to take the dispersions into account, and obtain a high switching speed on highly capacitive loads.

These purposes are achieved by a supply device of the type defined at the beginning of the description which, according to the invention, includes a low-voltage power source, a circuit creating intermittent high voltage from the low voltage power source, a set of switches placed between the circuit creating the intermittent high voltage and the electrode system of the said electrooptical cells, and circuits processing the clock signals to control the said circuit creating intermittent high voltages, as well as the said switches.

The invention, with a pulsed-type high voltage generator, stores the low-voltage power and operates at high voltage only at the time the power is transferred to the electrooptical cells. It is thus possible to control the current levels involved, and especially to supply power to the electrooptical cells just at the transitions prior to the front switching transinent of the cell state, since the capacitance of the electrooptical cells allows them to maintain a charge even when they are disconnected from the high-voltage source. The invention also easily recovers energy during the switchover from one cell to the other.

The present invention can be used just as well for single-window type observation devices having a single capacitive-effect electrooptical cell, as with binocular type observation devices having a first and second capacitive-effect electrooptical cell, each coordinated by a system of electrodes. In the latter case, the clock signal processing circuits may include synchronization systems that can receive a synchronization signal from the outside world to control sequentially the said circuit creating intermittent high voltage, and the said switches.

In one embodiment of the present invention, the autonomous power supply, used with stereoscopic glasses, includes a system for receiving a carrier wave modulated by synchronization signals that periodically trigger high-amplitude electric control signals applied alternately to the electrode systems of the first and second cells, and the clock signal processing circuits include circuits for processing the synchronization signals received by the said carrier reception system, to sequence the said circuit creating the intermittent high voltage, and the said switches.

One major characteristic of the present invention is that the circuit creating the intermittent high voltage includes a coil and a switching component, mounted in series at the terminals of the low-voltage power source, as well as a capacitor connected in parallel with the switching component, and the said switching component is controlled periodically by the signal processing circuits.

Preferably, the device as invented includes a first switch connected between the common point of the coil and switching component and one electrode of one of the capacitive-effect electrooptical cells. The first switch is controlled in such a way that it is closed as soon as the switching component begins to open, for a time smaller than the aperture duration of said switching component.

The autonomous power supply may also include a second switch, mounted between the said electrode of one of the electrooptical cells and the end of the inductance coil connected through an anti-feedback diode to the low-voltage power source, and the said second switch is controlled in such a way that it is closed from the time the switching component begins to close, for a time smaller than the closed state duration of said switching component.

In another embodiment, the autonomous power supply includes a first and third switch circuited between the common point of the inductance coil and the switching component and one electrode of the first and second electrooptical cells, respectively. Second and fourth switches are circuited between the side of the inductance coil connected through an anti-feedback diode to the low-voltage power source, and the common point between the first switch and the first electrooptical cell and the common point between the third switch and the second electrooptical cell. The first and fourth switches are controlled in such a way as to be closed simultaneously as soon as the switching component begins to open, at every two periods of the switching component control signal. The second and third switches are controlled in such a way as to be closed simultaneously as soon as the switching component begins to open. During the switching component control signal periods, the first and fourth switches remain open continuously, and the time during which the first, second, third and fourth switches is closed is always less than the time the switching component stays open.

According to other particular characteristics, a clipping diode is placed in parallel with the capacitor, which is placed in parallel with the switching component, and a diode may also be connected in series with the said switching component, at the terminals of the said capacitor, for protection.

As per the invention, it is advantageous to include in the device a circuit that modulates the duration of the switching component closing control signal.

For this purpose, the device can include a divider bridge measuring the high voltage applied periodically to the point in common between the inductance coil and the switching component, a sample-and-hold circuit, a comparator to detect the difference between the sampled voltage and a reference voltage $V_{ref}$, and a circuit that, as a function of the signal output by the said comparator, applies a delay to the signal controlling the closing of the switching component.

The circuits processing the synchronization signals received by the receiving system may include a phase-locked loop and a programmable matrix of logic circuits for controlling the switching sequences of the switches.

In a particular configuration, the switch controls are of the floating type and include a high-voltage switching component such as a bipolar transistor, a field effect transistor or a thyristor, placed in the diagonal of a diode bridge, and an isolator to apply a control signal to the switching component.

The isolator is preferably of the piezoelectric isolator or rectilinear transformer operating at resonance.

The low-voltage power source, the circuit creating intermittent high voltage, all of the switches and the circuits processing the synchronization signals are carried in a portable unit that is connected to the reception systems and to the first and second cells by three or four electrical connection wires.

In a first possible mode of operation, all of the switches have floating control, and provide bipolar control of the high voltage applied to the electrodes of the first and second electrooptical cells.

In another possible mode of operation, all of the switches provide single-pole control of the high voltage applied to the electrodes of the first and second electrooptical cells.

In the latter case, the switches can each include a field effect transistor, an auxiliary capacitor placed between the grid and the source of the said field effect transistor, a diode connected in series with the drain-source space of the said field effect transistor, and an isolator.

BRIEF DESCRIPTION OF THE DRAWINGS

Other characteristics and advantages of the invention will appear in the following description of particular modes of construction, which refer to the attached drawings, of which:

FIG. 5 shows the timing diagram of the control signals of the switching component and of the switches in the device in FIG. 2.

DETAILED DESCRIPTION OF THE PREFERRED EMBODIMENTS

Figure 1:
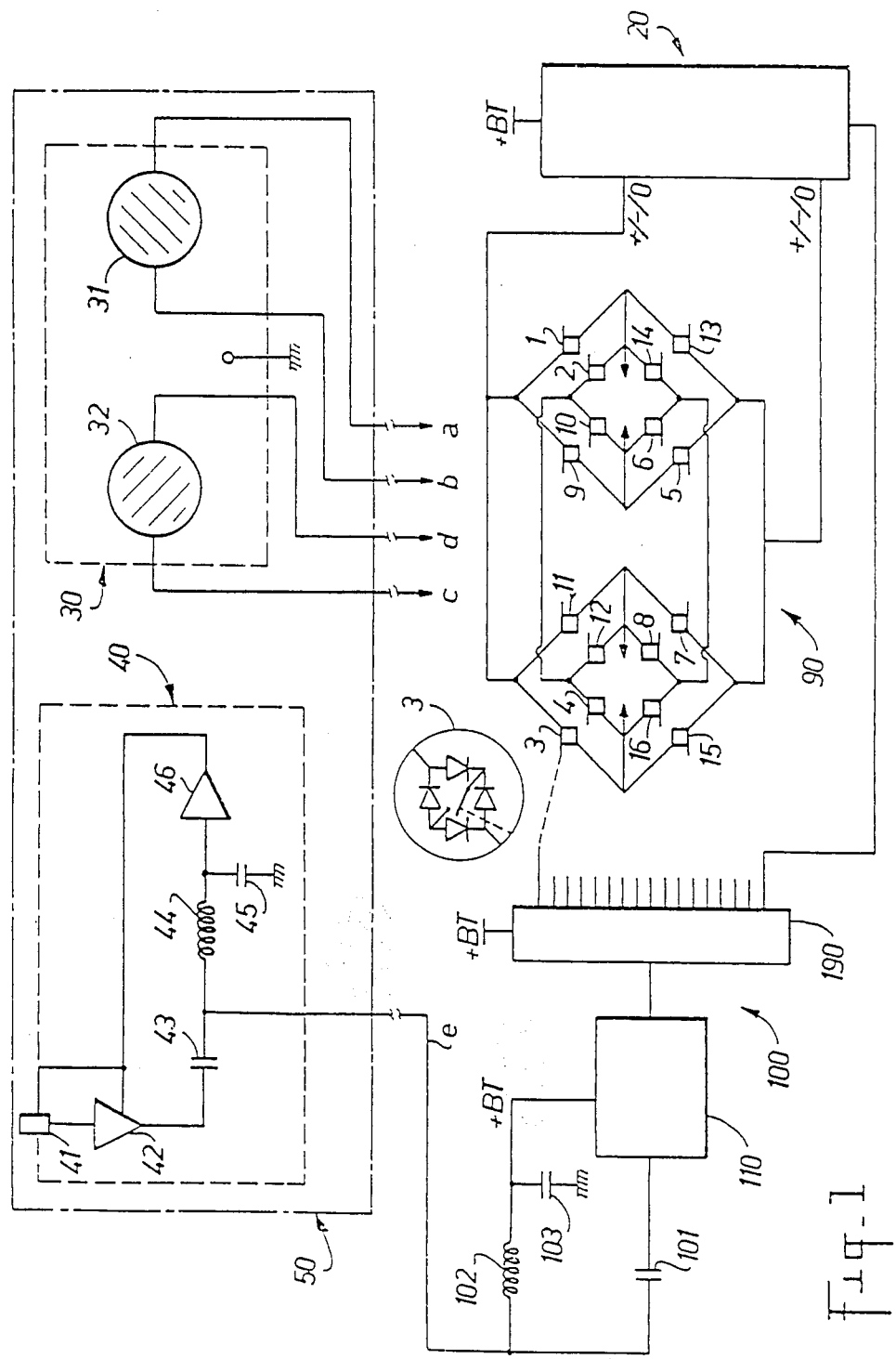
FIG. 1 gives a general schematic of a general mode of autonomous power supply construction as per the invention, FIG. 2 gives a schematic of a particular mode of autonomous power supply construction as per the invention, of the single-pole with a pulsed high voltage source, FIG. 3 gives a sample diagram of a floating control switch that can be used as per the invention, FIG. 4 gives a sample diagram of a switch isolator control circuit that can be used in the device as per the invention.

FIG. 1 gives the general diagram of an autonomous power supply for a pair of glasses (50) for observing in image with stereoscopic effect, which includes subassembly (30) with right-hand observation device (31) and left-hand observation device (32), intended to be placed in front of the observer's right and left eyes, respectively. The glass frames for placing right and left devices (31, 32) in front of the observers eyes may have a conventional structure, with two arms, designed to lean on the observer's ears, and a front part for supporting right and left devices (31 and 32).

Right and left devices (31 and 32) each include an electrooptical material placed between two electrodes.

The material may be of the PLZT type, for example. The electrodes, for example, may consist of a network of interdigitated electrodes deposited on each face of the crystal. Devices (31 and 32) thus consist of capacitive effect electrooptical cells which, when placed between crossed polarizers, can alternately enable or prohibit the transmission of light, depending on whether a control voltage is applied to the cell electrodes or not.

Figure 10:
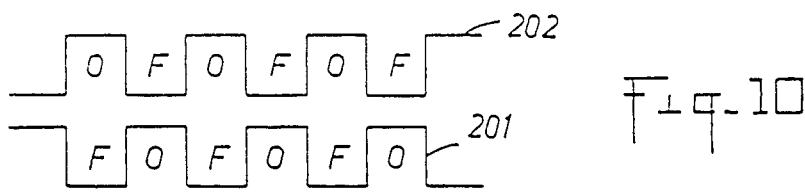

A stereoscopic effect is obtained when the transmission of light is enabled periodically, alternating between right and left devices (31 and 32). FIG. 10 shows the state change sequences for cell (31) of a right-hand device (curve 201) and for cell (32) of a left-hand device (curve 202), between the open state 0 (when light is transmitted) and the closed state F (when light is not transmitted).

Figure 11:
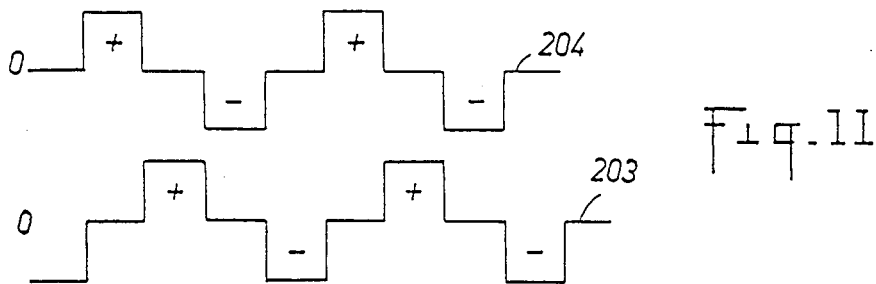

FIG. 11 gives an example of the electric control signal sequence of cells (31 and 32) of the bipolar type, with the shape of the high voltage electric signals that can be applied to the electrode pairs of cells (31 and 32) (curves 203 and 204, respectively) to create the state change sequences shown in FIG. 10.

Figure 12:
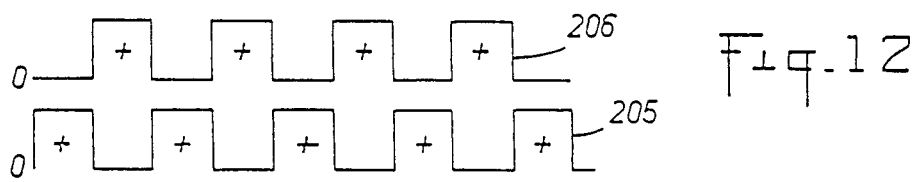

FIG. 12 gives another example of the electric control signal sequence of cells (31 and 32) of the single-pole type, with the shape of the high voltage electric signals that can be applied to the electrode pairs of cells (31 and 32) (curves 205 and 206, respectively) to create the state change sequences shown in FIG. 10.

In FIGS. 11 and 12, the electrical control signals of cells (31 and 32) are represented as square periodic signals applied in alternate sequence to the electrode pairs of cells (31 and 32). This essentially corresponds to the signals at the terminals of each cell in operation. However, it should be noted that, according to the present invention, the actual time needed to connect a pair of electrodes to a high voltage generator is less than the time this voltage is applied to the cell. In effect, because of its capacitive nature, an electrooptical cell (31, 32) can maintain its charge by remaining polarized, even after the connection to the high voltage generator is suppressed. Essentially, then, the present invention uses a power supply including sequential high voltage generator (20), which delivers pulsed high-voltage energy, but stores energy internally only in the form of a low voltage. By means of set (90) of switches, which switch and control the pulsed application of a high voltage to cells (31 and 32), power is applied to cells (31 and 32) only at the initial transition of the switching pulse.

To observe television images, a pilot signal synchronized with the television receiver scanning rate must be available to synchronize the alternate application of the control signals to cells (31 and 32). The pilot signal can be obtained from a carrier wave, e.g. of the infrared type, modulated by the scanning trigger signals and picked up by infrared cell (41), installed in carrier wave reception system (40) in the glasses. As can be seen in FIG. 1, a single wire e can at the same time supply reception device (40) with a low-voltage power source and carry a high-frequency alternating component superimposed on the direct current signal, and representing the pilot signal picked up by infrared cell (41). FIG. 1 shows schematically carrier amplifier (42) in reception device (40), which receives signals output by sensor (41), one isolator capacitor (43) between the output of amplifier (42) and connection wire e, as well as one coil (44) and one capacitor (45) separating the high frequency from the low-voltage power source, placed between connection wire e and power supply regulator (46) for reception system (40).

Reception system (40), as well as device (30) with electrooptical cells (31 and 32) are installed in the glass frames themselves, while the autonomous power supply for devices (30 and 40) is contained in an independent, portable, compact unit connected to devices (30 and 40) by wires (a, b, c, d and e). Wires a and b are connected to the electrodes of right-hand cell (31), while wires c and d are connected to the electrodes of left-hand cell (32). In one version of construction, in particular as illustrated in FIG. 2, wires b and d are both connected to ground, and thus can be combined into a single ground wire.

The autonomous power supply itself, for applying high-voltage control signals to the electrodes of electrooptical cells (31 and 32), includes one low-voltage (BT) power supply, one circuit (20) creating intermittent positive and negative high voltage from the BT supply, one set of switches with floating control (1 to 16) and circuits (100) processing the synchronization signals received by reception system (40) and transmitted over line e. Processing circuits (100) include one circuit (110) that shapes the synchronization signals applied from line e through isolating capacitor (101). Inductance coil (102) and capacitor (103) separate, on the power supply side, the low-voltage power source signals of the BT source from the high-frequency synchronization signals received over line e.

Processing circuits (100) also include sequencing logic circuits (190), which may include a programmed logic array (PLA) and produce a synchronized sequence of signals for controlling switches (1 to 16) and circuit (20) creating intermittent high voltage.

Figure 2:
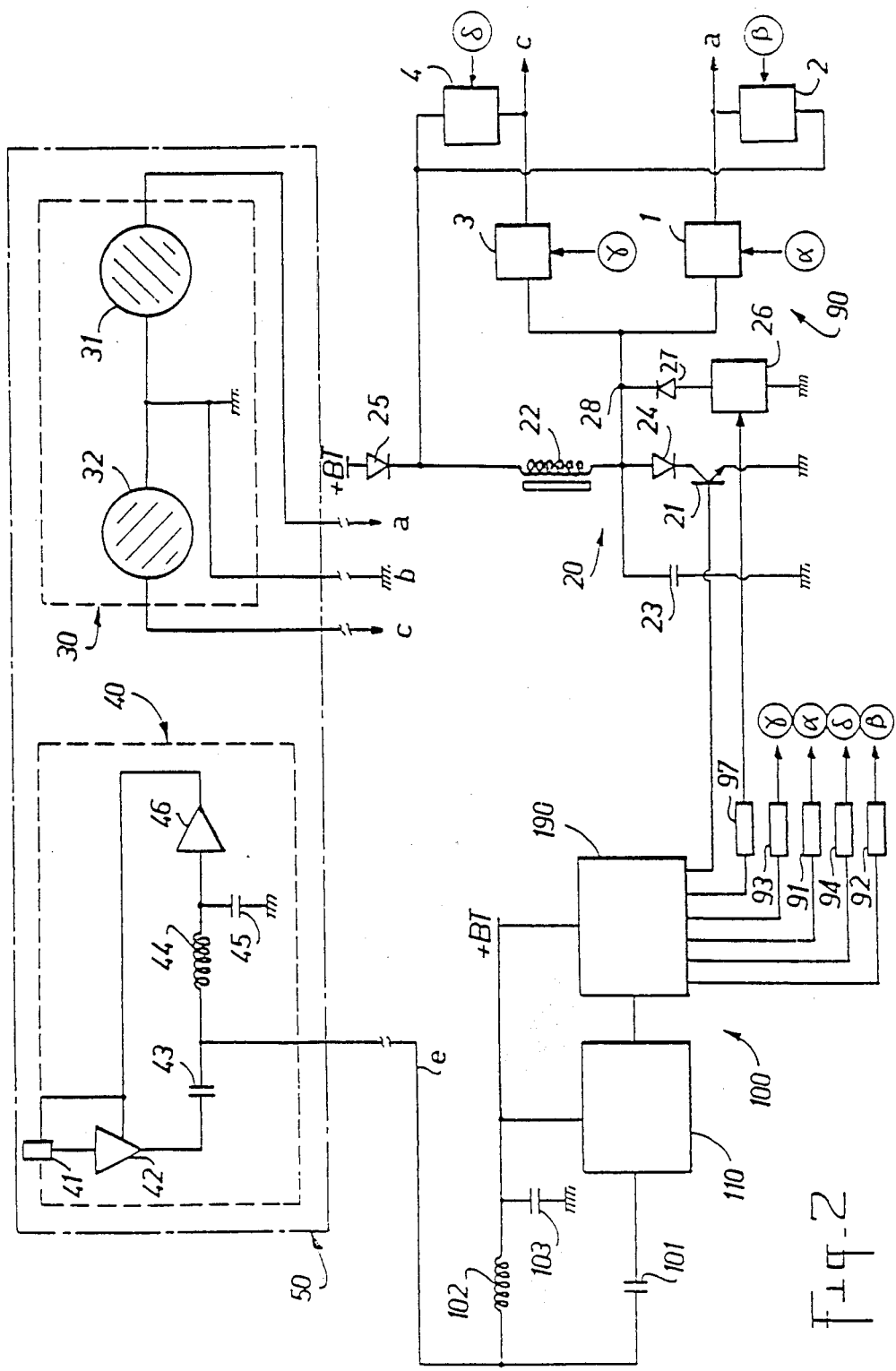

Floating control switches (1 to 16 in FIG. 1), mounted in the meshes of two similar networks, at the center of which are connected wires a, b and c, d, shown in FIGS. 1 and 2, supplying the electrode pairs of cells (31 and 32), are structured in bridges as shown schematically in FIG. 1 and, for a particular mode of construction, in greater detail in FIG. 3.

Floating control switches (1 to 16) can thus include a high voltage switching component (65) such as a bipolar transistor, a field effect transistor or a thyristor, circuited in the diagonal line across diode bridge (61 to 64), and one isolator (67) connected to processing logic circuits (190) that apply a control signal to switching component (65). A single or combined element (66) of a capacitive, resistive or inductive type, and possibly nonlinear, can also be mounted in series with switching component (65) to modify the switching.

Switching circuit (90) in FIG. 1 shows the general case by which the characteristics of switches (1 to 16) are adapted to control the pair of electrooptical cells (31 and 32) in a multitude of ways from a high voltage source that is pulsed on alternately intermittently and periodically by circuit (20), supplied with low voltage. Circuit (90) in FIG. 1, adapted to bipolar control, in particular provides a way of transferring charges from one electrooptical cell (31) to the other (32) and vice versa, and various ower recovery levels in the low-voltage power sources, as well as hold modes in which electrooptical cell (31 or 32) holds its charge in floating mode. It also provides a way of shunting cells (31, 32) quickly, for dynamic zero reset. Naturally, if certain sequences are such that certain meshes are always in the same state, the switches in these meshes can be replaced by equivalent components or can even, in certain cases, be shunted. Generally, we can note that a maximum of flexibility comes from the fact that the configuraton uses two series of bridge-mounted switches in succession for each cell. Thus, the control of right cell (31) may involve a first series of switches in bridge (9, 1, 5, 13) and then a second series of switches also installed in bridge (10, 2, 6, 14). The configuration of switches controlling left cell (32) is itself symmetrical with the switch configuration controlling the right cell. More particularly, switches (1, 9, 5, 13), and respectively (3, 11, 7, 15) of the first bridge, associated with right cell (31) and respectively left cell (32) control the application of the high voltage to controlled cell (31, or respectively 32) while switches (2, 10, 6, 14, and respectively 4, 16, 8 and 12) of the second bridge, associated with right cell (31, and respectively left cell 32) control the transfer of power from one cell (31, and respectively 32) to the other (32, respectively 31).

FIG. 2 gives a particular way of constructing the device in FIG. 1, and shows the structure of the pulsed high voltage source (20). The similar elements in the various circuits shown in the different figures all carry the same references, and thus can be identified more easily. Since devices (30, 40) of pair of glasses (50) and circuits (100) have already been described in referring to FIG. 1, these will not be described again. As already indicated above, the only difference consists of combining connection wires b and d into a single ground wire.

The mode of construction in FIG. 2 shows high voltage power source (20) supplied from low-voltage power source (BT) and including switching component (21), consisting of a transistor controlled by logic processing circuits (190). The presence of this switching component (21), and of a constant-current charge element, coil (22), provides a way of creating a pulsed high voltage from a quantified energy, without storing any energy in generator (20) in the form of a high voltage. Floating control switches (1, 3), which can be constructed similarly to the diagram in FIG. 3, switch the high voltage to the electrodes of right cell (31) and left cell (32), respectively. Floating control switches (2 and 4) are structured similarly to switches (1 and 3) and have a purpose that will be explained further on, in reference to the timing diagram in FIG. 5. Switches (1, 2, 3, 4) are controlled by circuits (91, 92, 93, 94), respectively, which receive signals from logic circuits (190) controlling the switching sequences. Circuits (91, 92, 93, 94) can be structured similarly to the diagram in FIG. 4, with a transistor (71) whose base receives the control signal from logic circuits (190, and one capacitor (73) connected in parallel with the collector-emitter junction of transistor (71). The control signal applied to isolator (67) of the switch to be controlled is taken from the collector of transistor (71). However, as FIG. 4 shows, one limit resistor (72) and one diode (74) can be connected in series between isolator (67) and the collector of transistor (71). The base of transistor (71) is also connected through resistor (75) to ground.

The structure and operation of circuit (20), generating a pulsed high voltage, shall now be described with reference to FIGS. 2 and 5.

Inductance coil (22) is connected between low-voltage power source (BT), through anti-feedback diode (25), and high-voltage production common point (28). One capacitor (23), having a low capacitance compared with that of capacitive cells (31, 32), e.g. perhaps of the order of one tenth of this capacitance, is connected between common point (28) and ground. The collector of transistor (21) is itself connected to common point (28) through connection diode (24), which prevents applying any reverse bias to transistor (21). One negative clipping diode (27) is also connected in series with switch (26) between said common point (28) and ground. This diode (27), with its cathode connected to common point (28), i.e. to the anode of diode (24), clips any negative levels that might appear on one or the other of capacitive cells (31, 32). Switches (2 and 4) are themselves connected between wires a, c, respectively, applying the high voltage cells (31, 32), respectively, and to the point where inductance (22) is connected with low-voltage power source (BT). Switch (26) is controlled by circuit (97), similar to circuits (91 to 94), and receiving signals from control logic circuits (190).

Circuit (20), producing a high voltage, operates as follows: In a first time period $T_1$, transistor (21) is made to conduct, which sends a current through inductance coil (22) from the low-voltage power source. The current in transistor (21), and thus at common point (28), increases practically linearly with time, starting from the initial time transistor (21) begins to conduct. When transistor (21) is inhibited at the end of conduction phase $T_1$, the circuit opens abruptly at common point (28) and the current stored in coil (22) discharges through capacitor (23) and, depending on whether switch (1) or (3) is energized or closed, through capacitive cell (31) or capacitive cell (32). The voltage at point (28) then exhibits a pronounced positive excursion, so that a high voltage can be applied to one of cells (31, 32). Capacitor (23) essentially avoids transitions that are too steep, as the voltage excursion rises at point (28) and avoids runaway oscillations. Switch (1), and respectively switch (3), are controlled in such a way that they remain closed for less time than the switching component, consisting of transistor (21), is open. When switch (1), or respectively switch (3) and transistor (21) remains inhibited, capacitive cell (31, respectively 32) remain charged but the unused residual energy in coil (22) is returned by switch circuit (26) to the low-voltage power source owing to anti-feedback diode (25). When transistor (21) conducts again, the current in the coil again begins to increase linearly to allow a new discharge of high voltage the next time transistor (21) opens. Switches (1 and 3) are, however, switched alternately every two periods of the control signal of transistor (21) to apply a charge to right cell (31) and alternately to left cell (32). The discharge of cell (31, respectively 32) is controlled by switch (2, respectively 4). When cell (31, respectively 32) remains charged after applying a high voltage through switch (1, respectively 3), corresponding discharge switch (2, respectively 4) is controlled in such a way as to remain closed for a short interval of time during the period transistor (21) conducts, or does not conduct, immediately following the inhibition period that caused said cell (31, respectively 32) to charge. When switch (2, respectively 4) closes, cell (31, respectively 32) discharges through coil (22) and transistor (21), if the transistor is conducting, thus adding to the energy buildup in coil (22). In practice, to give an example, a control sequence can be adopted for the circuit in FIG. 2 such as the one shown in FIG. 5, where switches (1 and 4) are controlled simultaneously by signals $Ve_1$ and $Ve_4$ and switches (2 and 3) are also controlled simultaneously by signals $Ve_1$ and $Ve_4$, but in alternation with switches (1 and 4). Each switch (1, 2, 3, 4) is thus controlled every two periods of the control signal of switching transistor (21), and the shape of the resulting voltages $V_a$ and $V_c$ on lines a and c are shown in FIG. 5.

Figure 6:
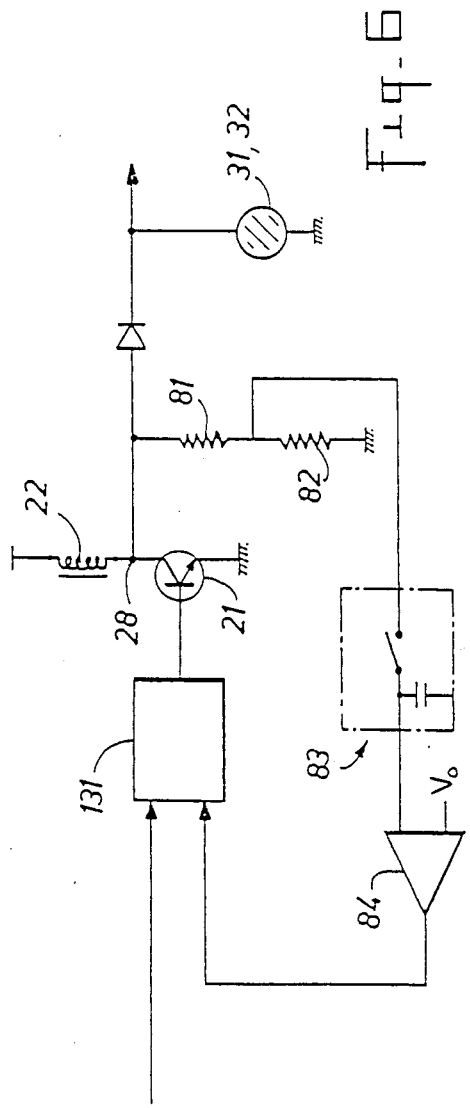
FIG. 6 shows a circuit that can shift the phase of the signal controlling the closing of the pulsed high voltage source switching component.
Figure 7:
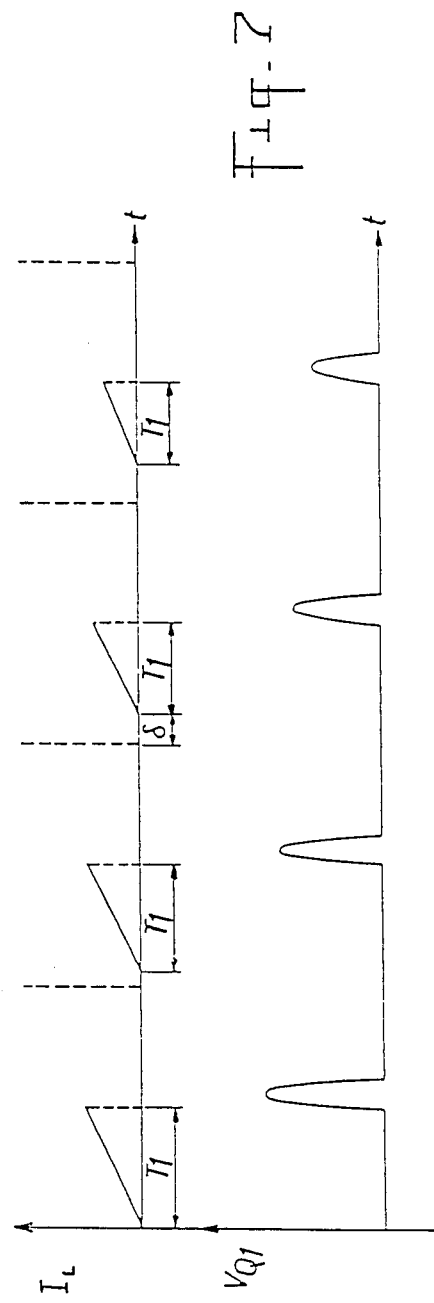
FIG. 7 shows the time variation of the current and voltage at the output from the circuit in FIG. 6.

Naturally, other control sequences are possible by which more or less energy can be recovered as the control passes from one cell (31, respectively 32) to the other (32, respectively 31). The control sequences can also compensate for disparities between cells (31 and 32) by applying two different actions one time out of two. The circuit in FIG. 6, which controls the output voltage at output point (28) as shown in FIG. 7, also makes the autonomous power supply more versatile in use, as per the invention. The maximum voltage at point (28) applied to cells (31, 32) is set by modulating the length of the conduction control signal of transistor (21).

Yet, considering the fact that the stereoscopic viewing system is synchronized, the times at which transistor (21) conducts are preset. On the other hand, since the system is periodic, the time at which transistor (21) begins to conduct can be changed from one period to the next. FIG. 7 shows the variation of the current $I_L$ in inductance coil (22) during different successive periods as transistor (21) conducts, and the shape of the voltage $V_{q1}$ at output point (28) when transistor (21) opens during successive periods.

To determine the delay $\delta$ to be applied at the start of the conduction control of transistor (21), it is appropriate to detect the maximum voltage level present when transistor (21) opens on output (28) and then compare this detected value with the desired value, and apply the difference to a circuit that will modify the conduction time of transistor (21) by adding a delay $\delta$ with respect to the expected periodic control signal time. This is done with a circuit of the type shown in FIG. 6, which picks up the voltage at output (28) by divider bridge (81, 82) and applies it to sampel-and-hold circuit (83). The output from sample-and-hold circuit (83) is applied to the first input of comparator (84), which receives reference voltage $V_o$ on its other input. The error signal of comparator (84) is then applied to processing circuit (131), which also receives synchronization pulses related to the signal output by reception system (40).

It is advantageous to use processing circuit (131), including a phase-locked loop that creates signals at a determined phase separation from an incoming synchronization frequency. The phase separation with respect to the pilot signal is determined by the error voltage from comparator (84), which thus provides a voltage control.

Isolators (67), used in combination with floating control switches like the one shown in FIG. 3, can be constructed conventionally, with optoisolators or transformers. However, it is preferable to use piezoelectric ceramic resonators as isolators, or linear transformers operating at resonance, in particular to save on energy and to make it easier to obtain the "common mode" high voltage from the switching component.

It should be noted that by using a chopping signal during the switching on the loads, the spurious oscillation modesin the loads can be inhibited or reinforced in the material in a preset way, for better performance.

With a 12 V low-voltage power source and a 50 Hz state change control for the pair of electrooptical cells (31, 32), which thus go through 25 state changes per second and present capacitances of some 30 nF, it is possible, with change of state times of the order of 100 μs at the transitions, to apply voltages of some 1000 V with a power of approximately 1 W, because the energy can easily be recovered from one cell to the other.

Figure 8:
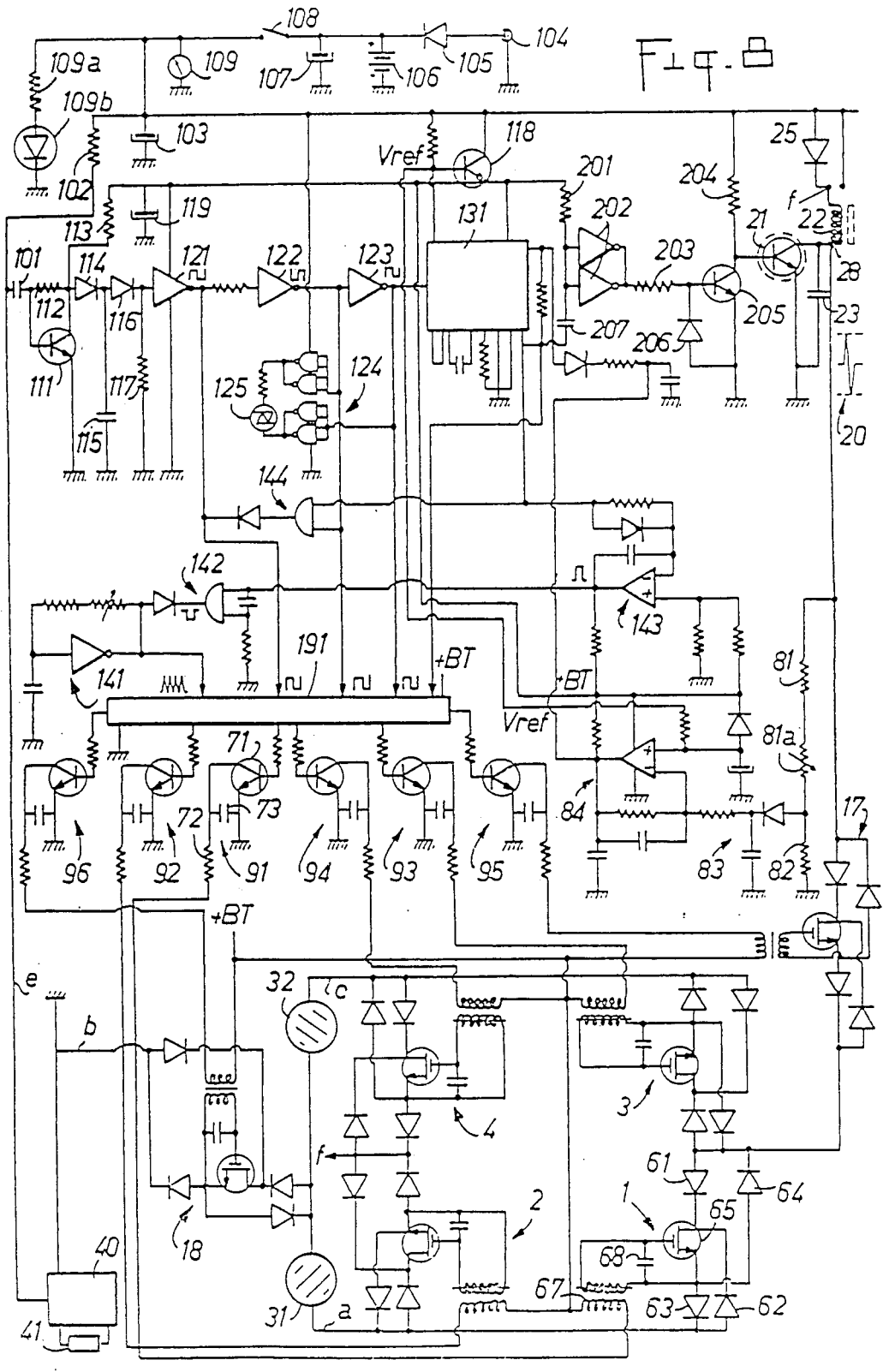
FIG. 8 is an overall diagram of an example of autonomous power supply with bipolar operation, using one switching component and six switches.

FIG. 8 is a detailed diagram of a possible autonomous power supply construction as per the invention, by which a bipolar control is applied to electrooptical cells (31, 32). The diagram in FIG. 8 is thus an extension of the general diagram in FIG. 1.

FIG. 8 shows a low-voltage power source (BT) with accumulators (106) that can be recharged through diode (105) from external source (104), one tank capacitor (107), one general switch (108), indicators (109, 109a) indicating the state of the low-voltage power source. The high frequency signals from circuit (40) receiving a modulated carrier wave, once the low-voltage power source signals are separated out, are applied to one pre-amplifier (111, 112 or 113) and then to a shaping stage (not shown), including smoothing or decoding circuit (114, 115, 116, 117). The signals from shaping stage (110) are then phase-shifted successively by circuits (121, 122, 123) and applied to phase-locked loop (131), to which the signal error from comparator (84) is also applied. The signals output by PLL circuit (131), supplied with a power supply regulated by transistor (118) are applied through isolating capacitor (207) and control circuit (202 to 206) to the base of transistor (21), used as a high voltage chopper, with its collector connected through diode (24), as shown in FIG. 2, to tank coil (22).

Processing logic circuits (100) include one programmed, or programmable, logic unit (191), which generates the switching sequences by delivering control signals which are applied through control circuits (91 to 96) to the primaries of isolators (67) of floating control switches (1, 2, 3, 4, 17, 18). Processing logic circuits (100) also include parity indicator (124) with light-emitting diode (125), connected to the output of phase-shift devices (122 and 123). Moreover, associated with divider bridge (81, 81a, 82), sample-and-hold circuit (83) and comparator (84), which controls the phase shift applied by circuit (131), are lock and inhibit circuits (143, 144), monostable circuit (142) and one oscillator (141).

Figure 9:
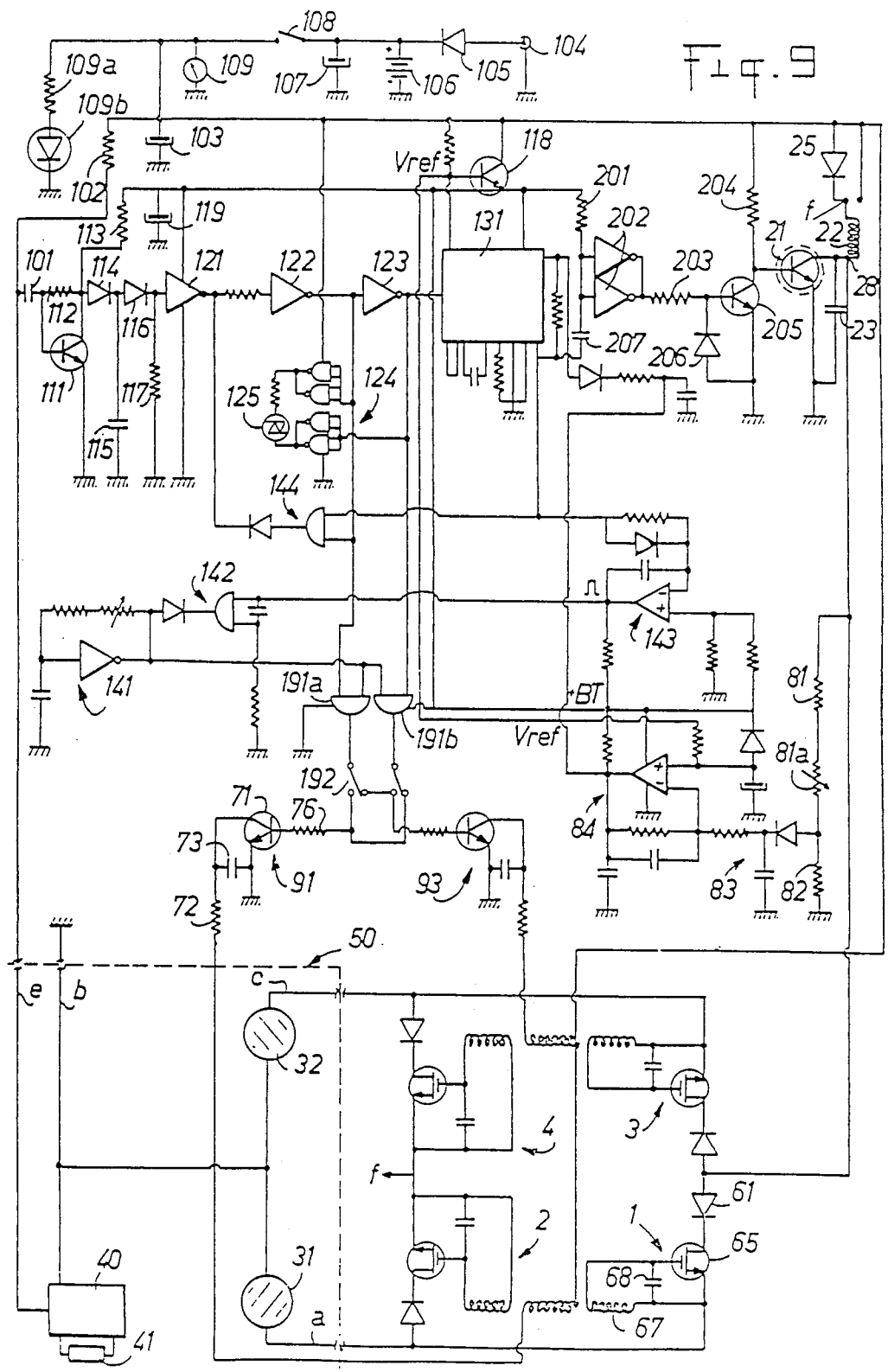
FIG. 9 is an overall diagram of an example of simplified autonomous power supply with single-pole operation, FIG. 10 gives an example of an optical transmission sequency by the electrooptical cells in a pair of stereoscopic glasses, FIGS. 11 and 12 give examples of electrical control sequences for the electrooptical cells, respectively of the bipolar and single-pole type, for the right and left devices together of a pair of stereoscopic glasses.

FIG. 9 shows a simplified version of the device in FIG. 8. The device in FIG. 9 provides a single-pole type control for electrooptical cells (31 and 32) and includes only four switches (1 to 4) which, because of the single-pole control, may include just one bipolar transistor or field effect transistor (65), one capacitor (68) associated with isolator (67) and one diode (61) replacing the diode bridge of the switches in the device of FIG. 8. Moreover, it is possible to use for isolators (67) two dual rectilinear transformers in place of the four single transformers as constructed in FIG. 8, considering the two-by-two synchronization of the control of transistors (65) in switches (1 to 4). Control logic circuits (100) can also be simplified because of the greater simplicity of the sequence. That is, two logic gates (191a and 191b), associated with reverser switch (192) controlling two control circuits (91, 93) of switch pairs (1, 2, 3, 4) can be substituted for circuits (191 and 91 to 96) in FIG. 8. Switches (17 and 18) in FIG. 8, placed on the high voltage and ground sides, respectively, can also be suppressed in FIG. 9, making for a particularly simple mode of construction.

As per the invention, the autonomous power supply is adapted to supply glasses which can or cannot allow stereoscopic viewing, depending on the type of control used.

Figure 13:
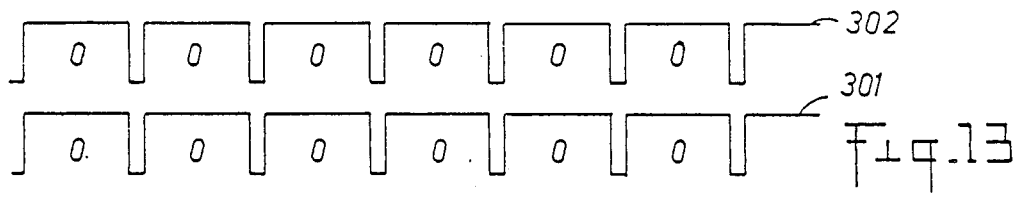
FIGS. 13, 14 and 15 give three types of optical transmission sequences that can be applied to the right and left electrooptical cells of the same pair of glasses.

FIG. 13 thus shows the shape of the optical transmission sequences (301, 302) applied to right and left electrooptical cells (31, 32, respectively) of the eyeglasses when a synchronizable internal clock is used to time the periodic creation of a high voltage by power supply circuit (20) without using a synchronization signal from the outside. FIG. 13 gives an example of an identical synchronous control for two cells (31 and 32), in which cells (31, 32) are in open state 0 most of the time, with only short periodic interruptions of optical transmission.

Figure 14:
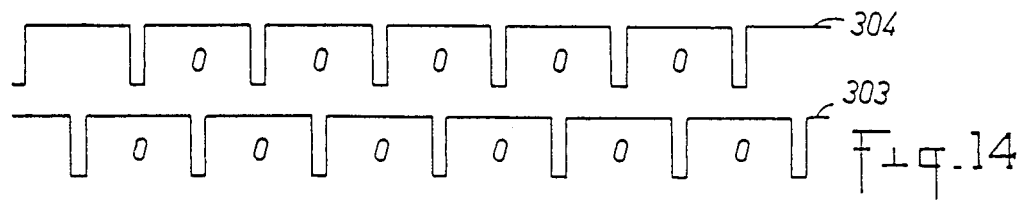

FIG. 14 shows the optical transmission sequences (303 and 304) applied to right and left electrooptical cells (31, 32, respectively) in a case very similar to the one in FIG. 13, but where the short periodic interruptions of the optical transmission of cell (31) are shifted intime with respect to the periodic interruptions of optical transmission of the other cell, depending on the control signal from the power supply.

Figure 15:
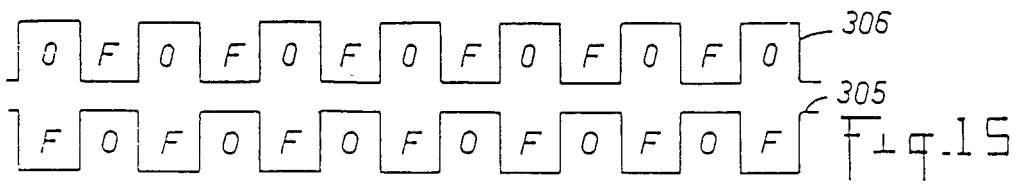

FIG. 15 shows the optical transmission sequences (305 and 306) applied to right and left electrooptical cells (31, 32) when a stereoscopic effect is desired. In this case, the internal clock is synchronized with an external synchronization signal and the periodic interruptions (f) of the optical transmission of cell (31 and 32) alternate in time and are equal to the periods of optical transmission (0).

We claim:

1. An autonomous power supply for a steroscopic observation device including first and second capacitive-effect electro-optical cells, each cell containing an electro-optical material and each cell being controlled by a system of control electrodes which receive high-amplitude electrical signals, and including a clock system for generating clock signals to control periodic application of electrical control signals to said control electrodes, said power supply comprising:

a low-voltage power source;

circuit means for generating intermittent high voltage from said low-voltage power source, including an inductance coil having first and second coil terminals, said first coil terminal being connected to a first terminal of said low-voltage power source, and said second coil terminal being connected to a second terminal of said low-voltage power source through a controllable switching component, and a capacitor in connected parallel with said switching component;

a set of switches connected between said circuit means for generating intermittent high voltage, and said system of control electrodes of said electro-optical cells;

means for processing said clock signals, including means for processing said synchronization signals received by said means for receiving, and for controlling said switching components and said set of switches;

means for receiving a carrier wave modulated by synchronization signals to control synchronized periodic application of said high-amplitude electric control signals to the electrode systems of said first and second electro-optical cells; and said set of switches comprising first and second controllable switches, each having first terminals connected intermediate said inductance coil and switching component and each having second terminals connected to respective electrodes of said first and second electro-optical cells, and third and fourth switches, each having first terminals connected to said first terminal of said inductance coil and each having second terminals respectively connected to said second terminals of said first and second switches, said first and fourth switches being controlled by said means for processing said clock signals to periodically close substantially simultaneously with the opening of said switching component every odd period of the control signal applied to the switching component, and said second and third switches being controlled to periodically close substantially simultaneously with the opening of said switching component during each even period of the control signal of the switching component, said first, second, third and fourth switches being closed for a time less than the time the switching component is open.

2. an autonomous power supply according to claim 1, further including an anti-feedback diode connected intermediate said first terminal of said low-voltage power source and said first terminal of said inductance coil.

3. An autonomous power supply according to claim 1, further including a clipping diode connected in parallel with said capacitor.

4. An autonomous power supply according to claim 1, further including a ciode connected intermediate said second terminal of said inductance coil and said switching component.

5. An autonomous power supply according to claim 1, further including means for modulating a time period that said switching component remains closed.

6. An autonomous power supply according to claim 5, further including:

sample-hold means for sampling a voltage at a point intermediate said inductance coil and said switching component;

means for comparing said sample voltage with a predetermined reference voltage; and delay means for controlling said time period that said switching component is closed as a function of said comparison.

7. An autonomous power supply according to claim 6, wherein said means for processing said clock signals includes a programmable logic circuit for controlling a switching sequence of said first, second, third and fourth switches to control spurious oscillation modes in said electro-optical cells.

8. An autonomous power supply according to claim 7, wherein said switching component is mounted in a diagonal of a diode bridge and wherein control signals are applied to said switching component through an isolator.

9. An autonomous power supply according to claim 8, wherein said isolator is a piezoelectric isolator.

10. An autonomous power supply according to claim 1, wherein said low-voltage power source, said means for generating intermittent high-voltage, said first, second, third and fourth switches and said circuits for processing the clock signals are mounted within a portable unit which is connectable with and removable from said first and second electro-optical cells.

* * * * *